United States Patent [19]

Schuster

[11] Patent Number: 4,941,955
[45] Date of Patent: Jul. 17, 1990

[54] APPARATUS AND METHOD FOR ELECTROCHEMICAL MACHINING OF FLAT PLATES OR SHEETS

[75] Inventor: John E. Schuster, Flossmoor, Ill.

[73] Assignee: The Interlake Companies, Inc., Oak Brook, Ill.

[21] Appl. No.: 305,456

[22] Filed: Feb. 1, 1989

Related U.S. Application Data

[63] Continuation-in-part of Ser. No. 69,865, Jul. 6, 1987, Pat. No. 4,820,390.

[51] Int. Cl.$^5$ .......................... B23H 3/10; B23H 7/32
[52] U.S. Cl. .............................. 204/129.5; 204/129.7; 204/224 M; 204/225
[58] Field of Search ................ 204/224 M, 225, 129.5, 204/129.7

[56] References Cited

U.S. PATENT DOCUMENTS

| | | | |
|---|---|---|---|
| 3,223,610 | 12/1965 | Inoue | 204/224 M |
| 3,305,470 | 2/1967 | Williams et al. | 204/224 M |
| 3,753,878 | 8/1973 | Gosger | 204/129.1 |
| 3,900,376 | 8/1975 | Copsey et al. | 204/141.5 |
| 4,127,459 | 11/1978 | Jumer | 204/129.5 |
| 4,290,867 | 9/1981 | Jumer | 204/224 M |

OTHER PUBLICATIONS

Article entitled "Electrochemical Machining" by A. H. Meleka and D. A. Glew, Sep. 1977, International Metals Reviews.

*Primary Examiner*—Donald R. Valentine
*Attorney, Agent, or Firm*—Emrich & Dithmar

[57] ABSTRACT

In a system for electrochemical machining of a workpiece in the form of a flat plate or sheet, the workpiece is supported on a flat first electrode, which is in turn supported on a relatively massive rigid support platform. A second electrode, having a working face defining an area substantially smaller than the area of the workpiece, is supported by a relatively massive framework a slight distance from a working surface of the workpiece in facing relationship therewith to define a working gap therebetween. Electrolyte fluid is introduced under superatmospheric pressure into the working gap through a passage in the second electrode and an opening in the working face thereof. Relative movement is effected between the second electrode and the workpiece longitudinally thereof while an electrical potential is applied across the electrodes to establish current flow between the workpiece and the second electrode for removing material from the former. In one version of the invention the platform is moved while the second electrode is maintained stationary, while in another version the second electrode is moved while the workpiece is maintained stationary. Sensor means and control means are provided for controlling the rate of relative movement between the workpiece and the second electrode and the adjustment of the working gap.

21 Claims, 6 Drawing Sheets

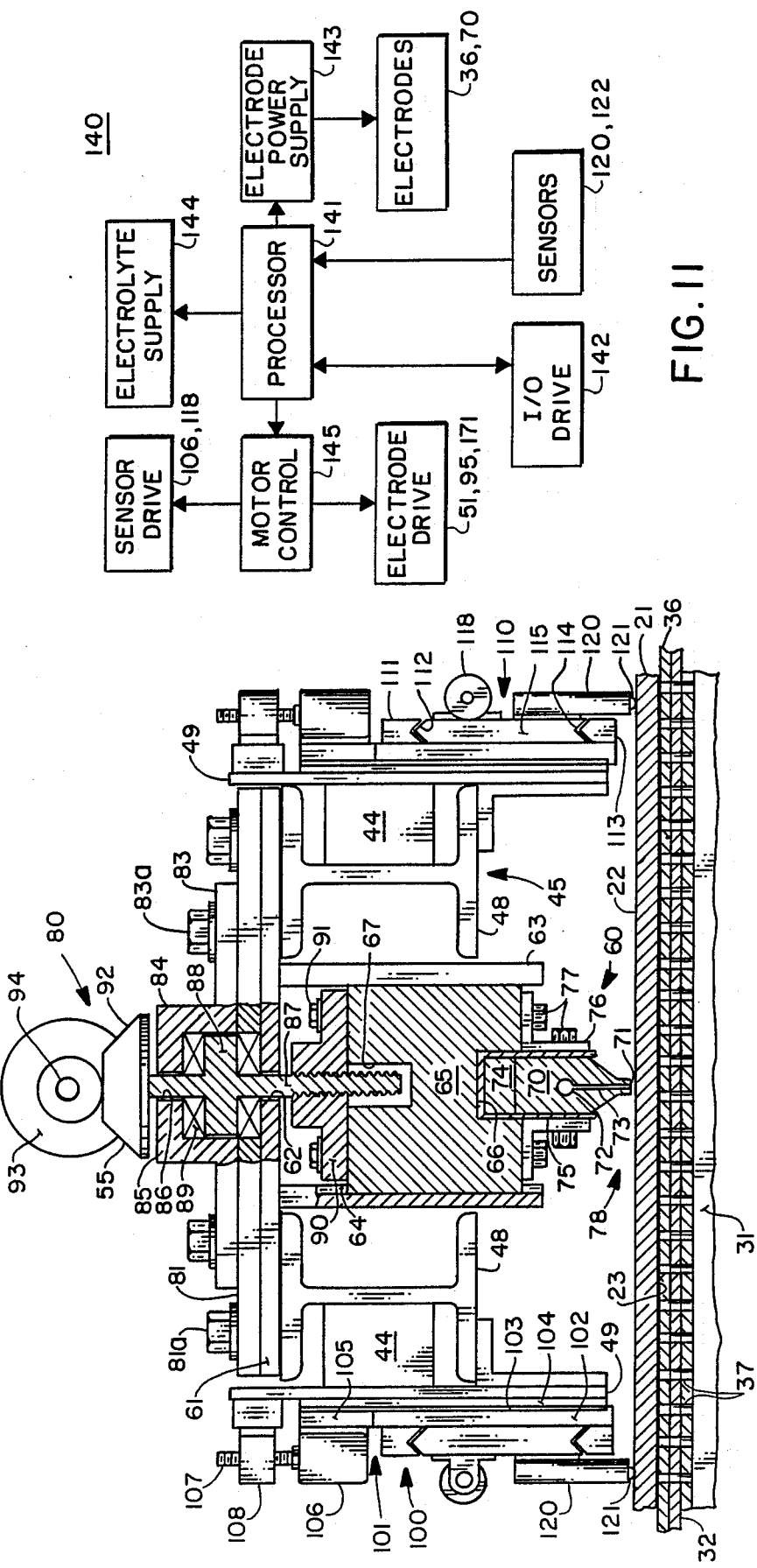

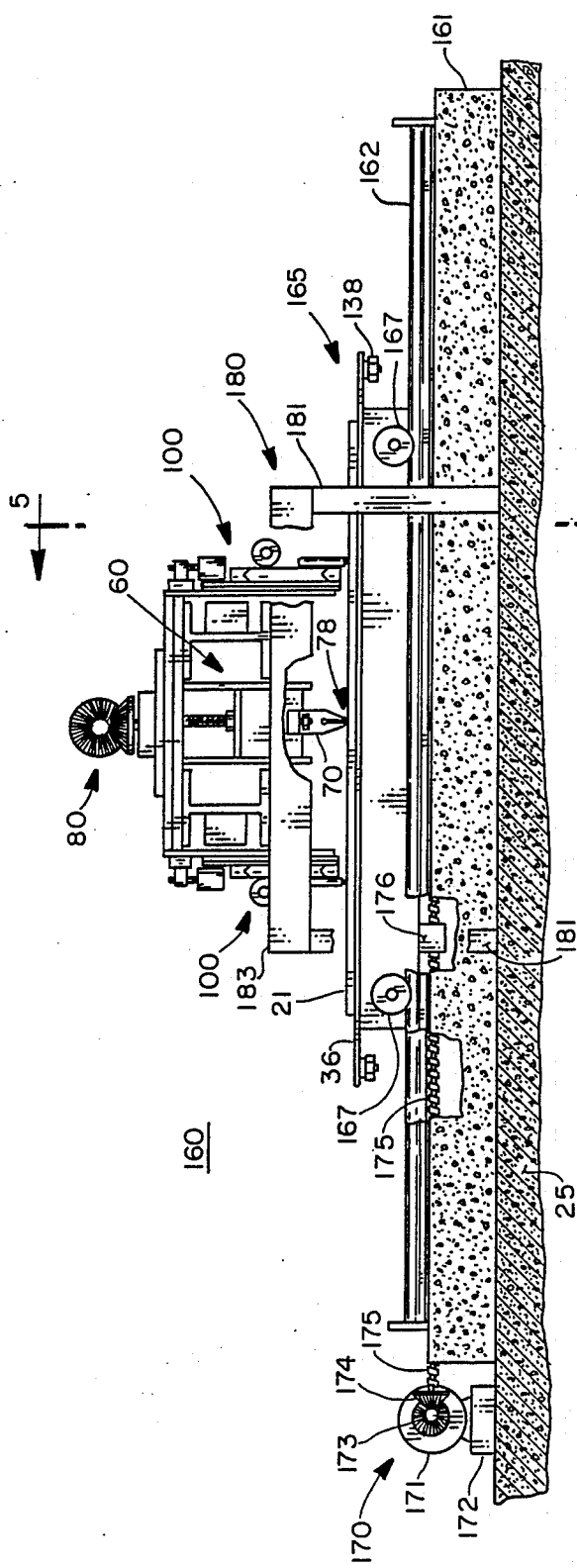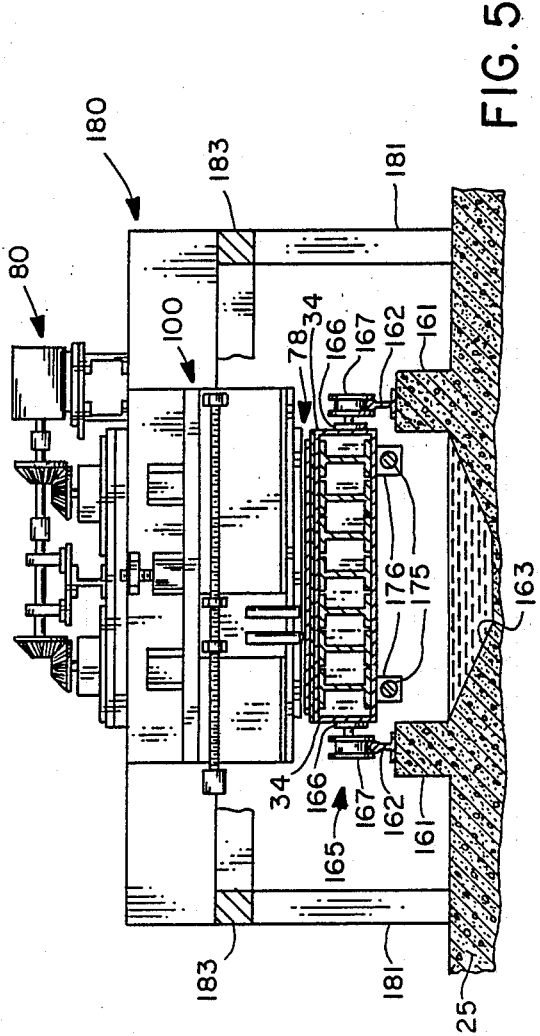

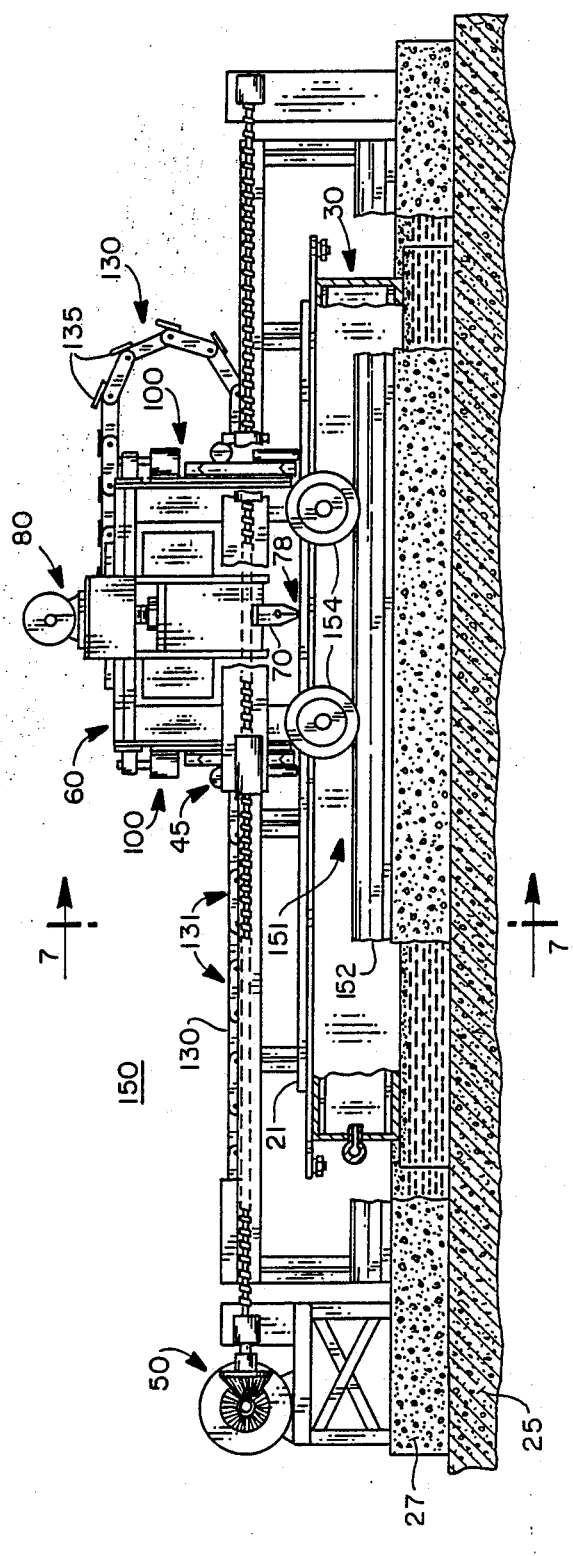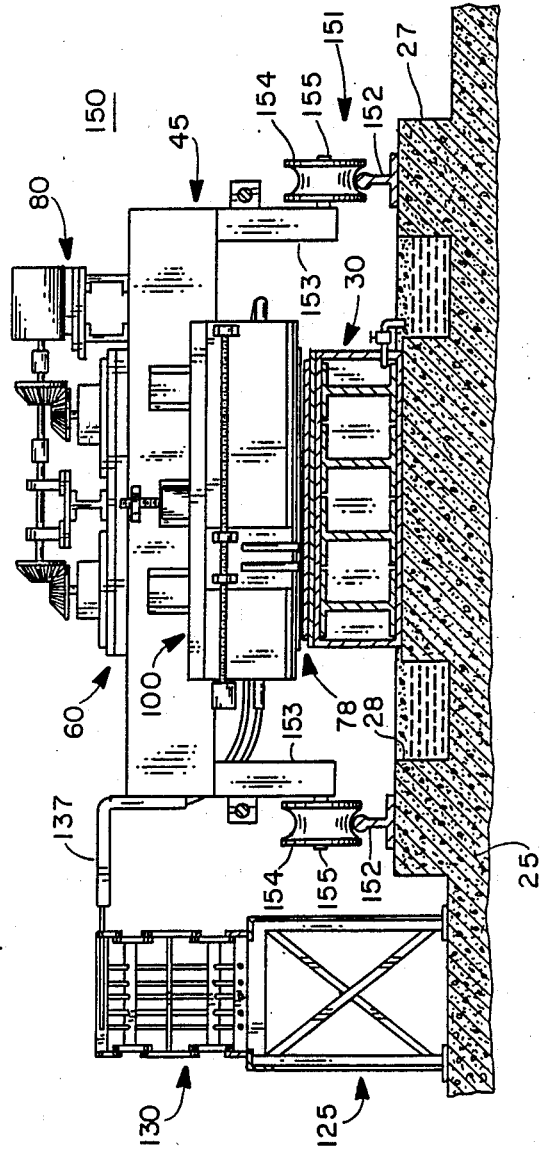
FIG. 6
FIG. 7

APPARATUS AND METHOD FOR ELECTROCHEMICAL MACHINING OF FLAT PLATES OR SHEETS

CROSS-REFERENCE TO RELATED APPLICATION

This application is a continuation-in-part of applicant's copending U.S. application Ser. No. 069,865, filed July 6, 1987 and entitled "Apparatus and Method for Continuous Electrochemical Machining of Strip Material", now U.S. Pat. No. 4,820,390 the disclosure of which is incorporated herein by reference.

BACKGROUND OF THE INVENTION

The present invention relates to electrochemical treatment of metals and, in particular to electrochemical machining of metal plates and sheets. The invention has particular application to the formation of thin metal foils from metal sheets.

Presently, flat plates can be machined and foils can be formed from flat sheets by mechanical machining techniques, such as grinding. This technique works relatively well for small-area sheets or plates. But it is extremely difficult to grind large-area plates or sheets, such as those having dimensions of $4' \times 9'$ or $5' \times 12'$, to tolerances as close as $+/-0.001$ inch, while maintaining a uniform plate or sheet thickness across the entire surface area of the workpiece.

A number of techniques have heretofore been used for the formation of metal foils from flat metal sheets. One such technique is by rolling. But the formation of a four or five-foot wide strip of foil gauge sheet on a strip mill is extremely difficult with many metals, for example titanium, due to the hardening that occurs in the metal with excessive rolling, causing it to fracture. Vapor deposition or plasma spraying can be used to produce foil, but foils produced by these techniques do not have the requisite grain structure. Chemical milling of foil from metal sheet has the disadvantage of needing a starting sheet with tolerances of $+/-0.001$ inch, which, as explained above, is expensive to obtain on small sheets and may be impossible to obtain on large sheets using conventional grinding.

The aforementioned copending application Ser. No. 069,865 discloses a system for electrochemical machining of continuous strip or web material by moving the web around a cylindrical electrode. That system is not suitable for the electrochemical machining of flat plates or sheets. The limited length of the plate or sheet does not permit handling by the continuous processing apparatus, and many plates would not have the required flexibility for bending around the cylindrical electrodes.

It has also been known to utilize electrochemical machining for working limited areas of a workpiece. Such a technique is disclosed, for example, in U.S. Pat. No. 3,753,878. Such processes are not suitable for machining the entire surface of a large-area flat workpiece.

It is known to perform other types of electrochemical processing operations on flat plate or sheet material. Thus cleaning or polishing of metal plates or sheets is known. One such system, disclosed in U.S. Pat. No. 4,127,459, supports the plate on spaced-apart electrode straps in a bath of electrolyte, while a working electrode screen is moved back and forth across the face of the workpiece. But the electrode arrangement utilized in this system is not suitable for electrochemical machining, particularly machining to close tolerances and at foil gauges.

Another such system is disclosed in U.S. Pat. No. 3,900,376, in which the plate or sheet is fed between spaced-apart pairs of conductive rollers and over an electrolytic cell. Again, the electrode arrangement in this system is not suitable for electrochemical machining to close tolerances in foil gauges.

Furthermore, it is a fundamental object of cleaning and polishing systems to avoid any significant reduction in the thickness of the sheet material, which is the opposite of the intent in the electrochemical machining of plates or sheets, such as in the formation of reduced-thickness foil materials.

SUMMARY OF THE INVENTION

It is a general object of the present invention to provide an improved electrochemical machining system which avoids the disadvantages of prior systems while affording additional structural and operating advantages.

An important feature of the invention is the provision of an electrochemical machining method which permits machining of relatively large-area flat metal plates or sheets to close tolerances while maintaining substantially uniform thickness of material across the entire area of the workpiece.

In connection with the foregoing feature, it is another feature of the invention to provide a method of the type set forth, which provides for relative movement between the workpiece and a working electrode while maintaining a fixed working gap therebetween.

Another feature of the invention is the provision of a method of the type set forth, which provides a rigid support for the workpiece across its entire area, while affording a high-pressure flow of electrolyte fluid through the working gap.

Another feature of the invention is the provision of a method which permits the formation of foils of metals, such as titanium, which are difficult if not impossible to work by known techniques.

Another feature of the invention is the provision of a method of the type set forth which is characterized by relatively economical operation.

In connection with the foregoing features, still another feature of the invention is the provision of apparatus for performing a method of the type set forth.

Certain of these and other features of the invention are attained by providing apparatus for electrochemical machining of one of the opposed surfaces of a flat metal workpiece in the form of a plate or sheet, the apparatus comprising: first electrode means having a flat support surface adapted to be disposed in electrical and rigid supporting contact with the surface of the workpiece opposite the one surface over the entire area thereof, second electrode means having a working face with an area substantially less than the area of the workpiece, support means for supporting the second electrode means with the working face disposed a predetermined slight distance from the one surface of the workpiece in facing relationship therewith so as to establish a predetermined working gap between the second electrode means and a predetermined working area of the workpiece, transport means for establishing relative movement between the second electrode means and the workpiece for sweeping the working face across the entire one surface of the workpiece, means for continuously flowing an electrolyte fluid through the working gap in contact with the second electrode means and with the workpiece at a pressure substantially greater than atmospheric pressure, and coupling means for connecting an electrical voltage source to the first and second electrode means for promoting a flow of current through the workpiece and the electrolyte and the first and second electrode means to effect electrochemical removal of material from the one surface of the workpiece.

Other features of the invention are attained by providing a method for electrochemical machining of one of the opposed surfaces of a flat metal workpiece in the form of a plate or sheet, the method comprising the steps of: supporting the workpiece on a first electrode having a flat support surface such that the support surface is disposed in electrical and rigid supporting contact with the surface of the workpiece opposite the one surface over the entire area thereof, providing a second electrode having a working face with an area substantially less than the area of the workpiece, supporting the second electrode with its working face disposed a predetermined slight distance from the one surface of the workpiece in facing relationship therewith so as to establish a predetermined working gap between the working face and a predetermined working area of the workpiece, establishing relative movement between the second electrode and the workpiece for sweeping the working face across the entire one surface of the workpiece, continuously flowing an electrolyte fluid through the working gap in contact with the second electrode and with the workpiece at a pressure substantially greater than atmospheric pressure, and applying an electrical potential across the first and second electrodes for promoting a flow of current through the workpiece and the electrolyte and the first and second electrodes to effect electrochemical removal of material from the one surface of the workpiece.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings preferred embodiments thereof, from an inspection of which, when considered in connection with the following description, the invention, its construction and operation, and many of its advantages should be readily understood and appreciated.

FIG. 3 is an enlarged, fragmentary view in vertical section taken along the line 3—3 in FIG. 2, and with further portions broken away more clearly to show the construction;

FIG. 4 is a view similar to FIG. 1 of an electrochemical machining system constructed in accordance with and embodying the features of a second embodiment of the present invention;

FIG. 5 is a view in vertical section taken along the line 5—5 in FIG. 4, and with further portions broken away more clearly to show the construction;

FIG. 6 is a view similar to FIG. 1, illustrating an electrochemical machining system constructed in accordance with and embodying the features of a third embodiment of the present invention;

FIG. 7 is a view in vertical section taken along the line 7—7 in FIG. 6;

FIG. 11 is a functional block diagram of the control system for the electrochemical machining systems of FIGS. 1, 4 and 6;

DESCRIPTION OF THE PREFERRED EMBODIMENTS

Figure 1:
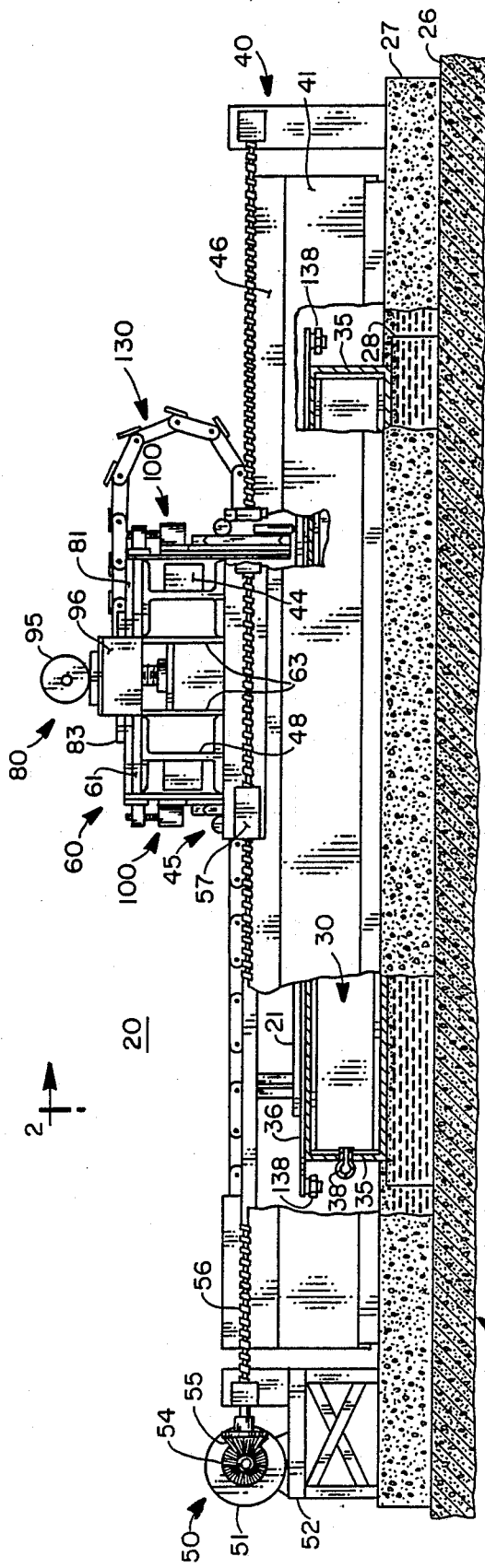
FIG. 1 is a side elevational view of an electrochemical machining system constructed in accordance with and embodying the features of a first embodiment of the present invention, with portions broken away more clearly to illustrate the internal construction.
Figure 2:
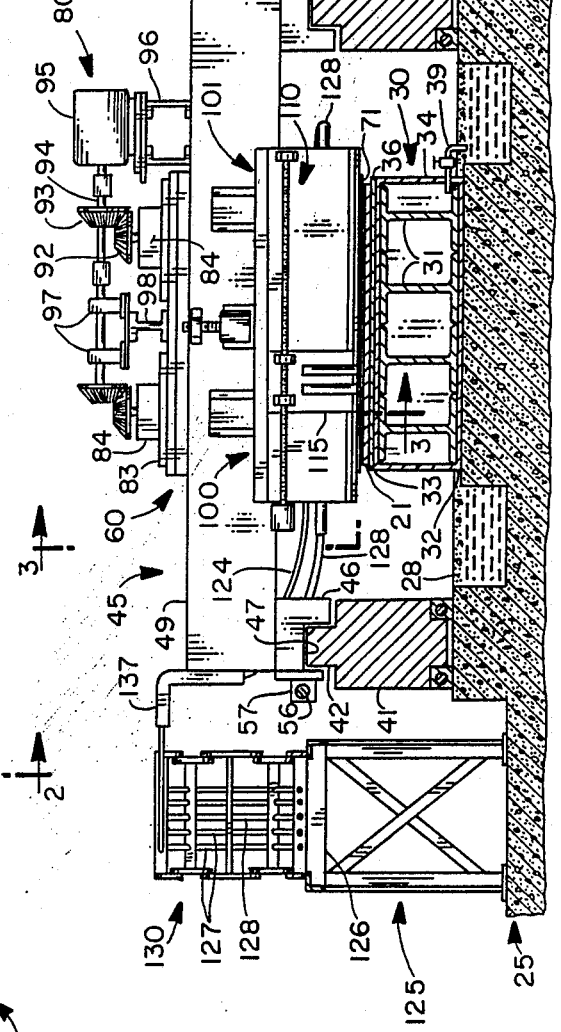
FIG. 2 is a view in vertical section taken along the line 2—2 in FIG. 1.

Referring to FIGS. 1-3 of the drawings, there is illustrated an electrochemical machining ("ECM") system, generally designated by the numeral 20, constructed in accordance with and embodying the features of a first embodiment of the present invention. The ECM system 20 is designed for electrochemical machining of a flat metal workpiece 21, such as a metal plate or sheet, which may typically be rectangular in shape, but could have any other desired shape. Such a workpiece 21 typically has flat, planar, opposed, parallel surfaces 22 and 23, one of which is typically disposed in use in contact with an underlying support electrode, while the other is machined by the ECM system 20 (see FIG. 3).

The ECM system 20 includes a massive, monolithic foundation 25, which may be formed of concrete or the like, a portion of which is formed below a floor level 26, and which also includes a raised pedestal portion 27 which projects upwardly above the floor level 26. There is preferably formed in the pedestal portion 27 a generally rectangular trough 28 which may be substantially rectangular in transverse cross section, for a purpose to be explained more fully below.

The ECM system 20 includes an anode support assembly 30 which is mounted on the pedestal portion 27 centrally thereof so as to be encompassed by the trough 28. The anode support assembly 30 includes a plurality of parallel I-beams 31 arranged side-by-side and enclosed within an airtight steel frame including a lower plate 32, an upper plate 33, a pair of side plates 34 and a pair of end plates 35. Mounted on the upper plate 33 is a flat rectangular anode 36, preferably formed of copper, and extending substantially the entire width of the upper plate 33 and extending longitudinally a slight distance beyond the ends of the upper plate 33.

Preferably, a plurality of very small-diameter holes 37 are formed through the anode 36, the upper plate 33 and the upper flanges of the I-beams 31 to provide communication with the interior of the anode support assembly 30. Also coupled to one of the end plates 35 is a vacuum conduit 38 which communicates with the interior of the anode support assembly 30 and is adapted to be coupled to an associated pumping mechanism (not shown) for drawing a vacuum inside the anode support assembly 30, thereby firmly to hold the anode 36 in place on the upper plate 33 by suction through the holes 37. Also communicating with the interior of the anode support assembly 30 is an electrolyte drain 39, whereby any electrolyte fluid which finds its way into the interior of the anode support assembly 30, as explained below, can be drained into the trough 28 by opening a valve when the machine is not in use.

The ECM system 20 also includes a cathode support assembly 40, which includes a pair of elongated footings 41 mounted on the pedestal portion 27, respectively adjacent to opposite sides thereof and extending substantially the entire length thereof. Each of the footings 41 has a reduced-thickness rail portion 42 at the upper end thereof. There is also provided a cathode carriage 45 including a pair of parallel, laterally spaced-apart elongated rails 46, each provided with a rectangular channel 47 on the underside thereof for cooperation with the rail portion 42 of the associated one of the footings 41. The rails 46 are interconnected adjacent to the opposite ends thereof by a pair of I-beams 48 which are closed at their outer sides by upstanding end plates 49. Balancing weights 44 may be mounted on the I-beams 48 for a purpose to be explained more fully below. The rail portions 42 of the footings 41 may be provided with a suitable bearing system, such as a system for delivering a bearing fluid to the interface between the rail portions 42 and the rails 46, to accommodate low-friction sliding movement of the cathode carriage 45 longitudinally of the footings 41.

This movement of the cathode carriage 45 is effected by a carriage drive assembly 50, carried by the pedestal 27 and arranged substantially to drive screws 56 on each side of the carriage 45. The carriage drive assembly 50 includes a reversible electric drive motor 51 mounted on a platform 52 which is mounted at one end of the associated pedestal 27 by suitable brackets 53. The output shaft of the motor 51 carries bevel gears 54 on each side of carriage 45 which are disposed in meshing engagement with bevel gears 55 carried at one end of each of two elongated drive screws 56, which extend horizontally along the outside upper edges of the associated footing 41 and are threadedly engaged with drive nuts 57 carried by the associated ones of the carriage rails 46. Accordingly, it will be appreciated that rotation of the drive screws 56 by the motor 51 effects longitudinal movement of the cathode carriage 45.

Referring now in particular to FIG. 3, a cathode assembly 60 is mounted on the cathode carriage 45, the assembly 60 including a horizontal base plate 61 which is mounted upon and spans the I-beams 48 and is provided with two laterally spaced-apart bores 62 therethrough midway between the opposite ends thereof. Depending from the base plate 61 just inside the I-beams 48 are a pair of parallel, spaced-apart guide plates 63, each provided with a guide channel 64 on the inner face thereof for receiving a support block 65 therebetween in vertical sliding relationship therewith. The support block 65 has an elongated, laterally extending channel 66 formed in the bottom face thereof and has a pair of bores 67 formed in the upper face thereof respectively in alignment with the bores 62 in the plate 61.

Carried by the support block 65 is an elongated cathode 70 which extends laterally across the entire width of the anode support assembly 30 and is provided with a reduced-area, flat, rectangular working face 71 at the lower end thereof. The cathode 70 is preferably formed of a suitable electrically conducting material, such as copper, and is provided with an elongated circular channel 72 extending longitudinally therethrough. The channel 72 communicates with a thin rectangular slot 73 which extends the entire length of the cathode 70 and exits at the working face 71.

The upper face of the cathode 70 is disposed in mechanical and electrical contact with an elongated bus bar 74 which is disposed in the channel 66 of the support block 65. An electrically insulating liner 75 lines the inner surface of the channel 66 and covers the outer side faces of the cathode 70 for electrically isolating the bus bar 74 and the cathode 70 from the remainder of the cathode assembly 60. The cathode 70 is secured in place by a pair of angle brackets 76 which are fastened by insulated screws 77, respectively to the outer sides of the cathode 70 and to the bottom face of the support block 65. In use, the working face 71 of the cathode 70 is disposed a predetermined slight distance from the upper surface 22 of the workpiece 21 to define a working gap 78 therebetween, as will be explained more fully below.

The working gap 78 can be varied by means of an adjustment assembly 80, which includes a flat, rectangular plate 81 disposed on top of the base plate 61 and secured therewith to the I-beams 48 by suitable fasteners 81a, the plate 81 being provided with a pair of circular apertures 82 formed therein, respectively coaxially with the bores 62 in the base plate 61. A pair of laterally spaced-apart, flat bearing plates 83 are secured atop the plate 81 by suitable fasteners 83a, each of the bearing plates 83 being provided with an upstanding cylindrical turret 84 having a flat, circular, top wall 85 provided with a central bore 86 therethrough arranged coaxially with the bores 62 in the base plate 61.

A pair of elongated shafts 87 are respectively disposed vertically through the central bores 62 in the base plate 61 and the aligned ones of the bores 86 in the turrets 84. Each of the shafts 87 has an enlarged-diameter bearing flange 88 disposed in the associated turret 84 between a pair of bearings 89, which are respectively disposed in the associated turret 84 and the associated one of the apertures 82. The lower ends of the shafts 87 are externally threaded and are respectively disposed in threaded engagement with nuts 90, which are fixedly secured, as by screws 91, to the top of the support block 65, the lower ends of the shafts 87 being accommodated in the bores 67 in the support block 65. The upper ends of the shafts 87 are respectively secured to bevel gears 55, which are in turn disposed in meshing engagement with bevel gears 93 journaled on an elongated horizontal drive shaft 94 of a reversible drive motor 95, which is mounted on a pedestal 96 spanning the I-beams 48. The shaft 94 is journaled through bearings in pillow blocks 97 supported on an intermediate support beam 98.

It will be appreciated that, in use, as the drive motor 95 is operated to rotate the shaft 94, the shafts 87 are, in turn, rotated for sliding the support block 65 up or down, depending upon the direction of rotation. By this means, the vertical position of the cathode 70 and the working face 71 thereof may accurately be adjusted.

Figure 8:
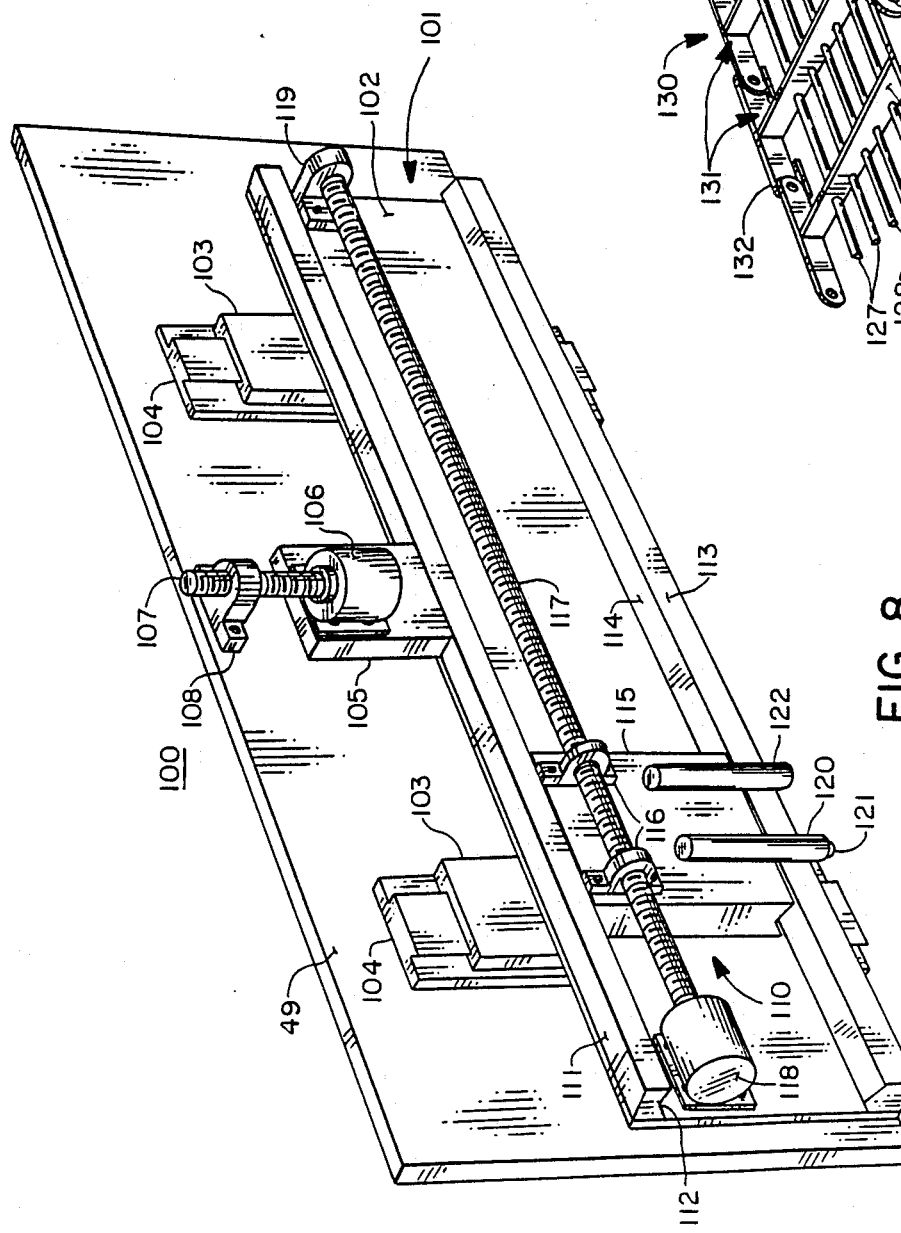
FIG. 8 is an enlarged perspective view of one of the sensor assemblies of the electrochemical machining systems of FIGS. 1, 4 and 6.

Respectively mounted on the end plates 49 at opposite ends of the cathode carriage 45 are two sensor assemblies 100, which are substantially mirror images of each other so that only one will be described in detail. Referring in particular to FIGS. 3 and 8 of the drawings, each sensor assembly 100 includes an adjustment carriage 101 comprising an elongated flat rectangular plate 102 arranged in a vertical plane and having fixedly secured to the rear surface thereof two laterally spaced-apart guide shoes 103. Each of the guide shoes 103 has a vertically extending dovetail-shaped groove therein disposed for meshing engagement with a dovetail tongue on a corresponding one of two elongated guide rails 104 mounted on the outer surface of the associated end plate 49 to accommodate vertical sliding movement of the adjustment carriage 101. Fixedly secured to the upper edge of the plate 102 intermediate the ends thereof is a mounting block 105 which carries a reversible electric drive motor 106 having an output screw shaft 107 extending vertically upwardly therefrom for threaded engagement with a nut block 108 fastened to the end plate 49. Thus, it will be appreciated that, by operation of the drive motor 106, the adjustment carriage 101 may be moved vertically up and down along the guide rails 104 for adjusting the vertical position of the sensor assembly 100.

The adjustment carriage 101 also carries a sensor sweep assembly 110. More specifically, there is mounted on the outer surface of the plate 102, respectively adjacent to the upper and lower edges thereof, an upper guide rail 111 having a V-shaped groove 112 in the lower surface thereof and a lower guide rail 113 having a V-shaped ridge or peak 114 along the upper edge thereof. Disposed between the upper and lower guide rails 111 and 113 is a carriage block 115, which has a peaked upper end for mating engagement in the groove 112 of the upper guide rail 111, and which is provided at the lower end thereof with a V-shaped groove for receiving the ridge 114 of the lower guide rail 113 for accommodating and guiding horizontal sliding movement of the carriage block 115 longitudinally of the plate 102. Fixedly secured to the outer surface of the carriage block 115 are a pair of laterally spaced-apart nut blocks 116 which are disposed in threaded engagement with an elongated drive screw 117 which is fixedly secured coaxially to the output shaft of a reversible drive motor 118 mounted on the plate 102. The distal end of the drive screw 117 is journaled in a suitable bearing in an end plate 119 carried at the opposite end of the plate 102. It will be appreciated that, in use, as the motor 118 is operated to rotate the drive screw 117, the carriage block 115 is moved longitudinally of the plate 102 in a direction dependent on the direction of rotation of the motor 118.

Mounted on the carriage block 115 are a contact sensor 120 provided with a depending feeler 121 and a water jet sonic sensor 122. In use, the feeler 121 of the contact sensor 120 is adapted to be disposed in contact with the upper surface 22 of the workpiece 21 for sensing the location thereof. The sonic sensor 122 emits a sonic signal which is reflected from the interface between the workpiece 21 and the underlying anode 36 to locate the bottom surface 23 of the workpiece 21. It will be appreciated that, as the cathode carriage 45 is moved back and forth longitudinally of the workpiece 21, one of the sensor assemblies 100 leads the cathode 70 and the other one trails it. A comparison of the signals from these two sensor assemblies can thereby give a reading of the amount of material being removed by the ECM system 20 during each pass and the thickness of the workpiece.

Referring now in particular to FIGS. 1, 2, 9 and 10 of the drawings, the ECM system 20 is provided with a utilities supply assembly 125 for delivering utilities to the moving cathode carriage 45. The utilities supply assembly 125 includes a platform 126 mounted on the foundation 25 at one side of the pedestal 27 and extending substantially the entire length thereof for delivering utilities, such as electrode power via line 124, motor drive power via cable lines 127 and electrolyte fluid via line 128. Also output signals from the sensor assemblies 100 may be carried by a cable line 129. The utilities lines 124, 127, 128 and 129 are coupled to the cathode carriage 45 by means of a flexible carrier 130 which is in the form of a plurality of interconnected I-links 131, each of which includes a pair of laterally spaced-apart parallel end rails 132 interconnected by a cross rail 133. The ends of the ends rails 132 are pivotally interconnected by pivot joints 134. Fixedly secured to one side of each joint is a flat restrictor plate 135 to limit the extent of pivotal movement. Each of the cross rails 133 has a plurality of holes 136 therethrough for respectively accommodating the utilities lines 124, 127, 128 and 129, which are preferably flexible conduits. One end of the flexible carrier 130 is fixedly secured to the platform 125 adjacent to one end of the cathode support assembly 40, for access to suitable utilities sources and a control assembly 140 (see FIG. 11), to which the adjacent ends of the utilities lines 124, 127, 128 and 129 are coupled. The other end of the flexible carrier 130 is pivotally secured to the cathode carriage 45 adjacent to the top thereof by a suitable pivot coupling 137. The adjacent ends of the utilities lines 124, 127, 128 and 129 extend along the coupling 137, the electrode power line 124 being connected to the cathode 70, the electrolyte fluid line 128 being coupled to both ends of the channel 72 in the cathode 70, the motor drive power lines being coupled to the drive motors 95, 106 and 118 and the signal 129 cable being coupled to the sensors 121 and 122. It will be appreciated that suitable electrical lines are also connected to bus bars 138 on the anode 36 and to the drive motors 51, but these may be fixed lines, since the anode 36 and the drive motors 51 are stationary.

Figure 10:
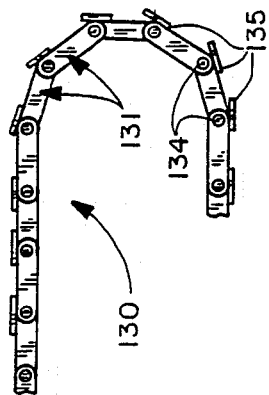
FIG. 10 is a fragmentary side elevational view of a portion of the carrier of FIG. 9.
Figure 9:
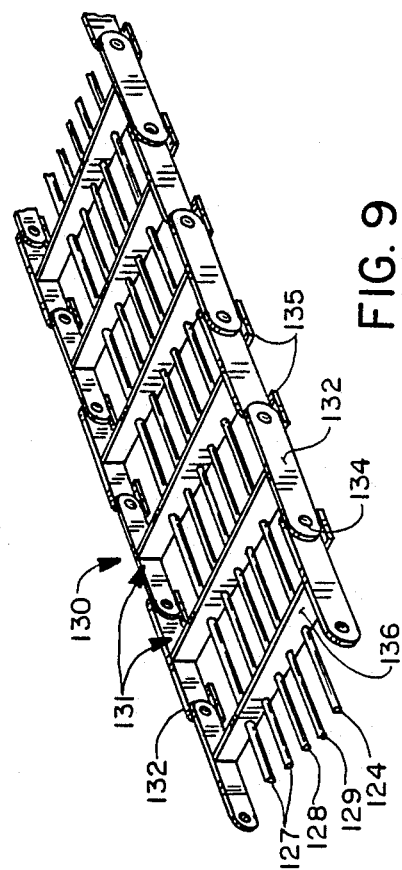
FIG. 9 is an enlarged, fragmentary, perspective view of a portion of the utilities carrier of the electrochemical machining systems of FIGS. 1, 4 and 6.

Preferably, the flexible carrier 130 has a length such that, when the cathode carriage 45 is at the maximum distance from the drive motors 51, most of the length of the flexible carrier 130 will lie flat upon the platform 126, while the distal end thereof will be inclined upwardly to the connection point on the carriage 45. As the carriage 45 is moved back toward the drive motors 50, the flexible carrier 130 folds back over itself, as is best illustrated in FIGS. 1 and 10, to form a relatively rigid upper flight parallel to that which lies along the platform 126. The rigidity of the links 131 and the presence of the restrictor plates 135 prevents the upper flight from drooping down into contact with the lower flight.

Referring now to FIG. 11, there is illustrated the control assembly 140 for controlling the operation of the ECM system 20. The control assembly 140 includes a central processor 141, which may be in the form of a microcomputer operating under stored program control. A plurality of input/output devices 142 may be coupled to the processor 141. Such devices may include a keyboard, for inputting data and program instructions, and output devices such as a CRT screen, indicator gauges or the like (not shown). The processor 141 is also coupled to an electrode power supply 143 to control the generation of electric power at a suitable DC voltage and current level for supplying a predetermined potential across the anode 36 and the cathode 70. The output of the processor 141 is also coupled to an electrolyte supply 144 to control pumps or other suitable devices for controlling the flow of electrolyte fluid to the cathode assembly 60. Another output of the processor 141 is coupled to a motor control circuit 145, which is in turn coupled to the electrode drive motors 51, the cathode adjustment motor 95 and the sensor drive motors 106 and 118 for controlling the speed and direction of operation thereof. The outputs from the sensors 120 and 122 are coupled to an input of the processor 141.

In operation, the ECM system 20 is intended to be used to "grind" plates and sheets to close tolerance and to machine sheets formed of metal, such as titanium, to foil gauge. Initially, the workpiece 21 is placed on the anode 36. If the edges of the workpiece 21 are at their final dimensions, they must be masked to protect them from potential etching by active electrolyte fluid passing over them. The anode 36 may, for example, have dimensions of approximately 12' × 5'. If the workpiece 21 is of a smaller area, it will be necessary to mask the uncovered surface of the anode 36. This may be done by placing strips of sheet plastic of the approximate final machined thickness of the workpiece 21 on the anode 36 and butting them against the workpiece 21. A vacuum is applied to the surface of the anode 36 via the conduit 38, the interior of the anode support assembly 30 and the vacuum holes 37 to hold the workpiece 21 and any masking sheet plastic in place. A secondary purpose of these masking sheets is to help "float" the cathode carriage 45, as will be explained more fully below.

The surface of the copper anode 36 might be protected against etching by coating it with a metal, such as tungsten, which does not react to the hydroxide radical in the electrolyte fluid.

When the workpiece 21 is installed in place, the operator raises the cathode assembly 60 to its maximum height by use of the adjustment assembly 80, and moves the adjustment carriages 101 of the sensor assemblies 100 to their maximum heights by use of the motors 106. The cathode carriage 45 is then moved forward until both contact sensors 120 are over the workpiece 21. The sensor gauges 120 are then lowered until the feelers 121 contact the workpiece 21. The sensors 120 are then lowered an additional 0.005 inch beyond the contact point to depress the feelers 0.005 inch. With the cathode 70 in its elevated position, the cathode carriage 45 is moved the length of the workpiece 21 at a controlled speed by use of the drive assemblies 50. As the carriage 45 is being moved, the contact sensors 120 on both the leading and trailing edges of the carriage 45 are moved back and forth by the sensor sweep assemblies 110 across the width of the workpiece 21 at a predetermined speed. For example, this speed may be such as to enable the sensors to cross the width of the workpiece 21 once for each two inches of forward travel of the cathode carriage 45. After the carriage 45 has traveled the length of the workpiece 21, the maximum height of the upper surface 22 of the workpiece 21 above the anode 36 will be known, since the elevation of the contact sensors 120 have been previously calibrated with the anode elevation. The maximum height of either the forward or rear contact sensors 120 is acknowledged by the processor 141, which then outputs a signal through the motor control circuit 145 to the drive motor 95 of the adjustment assembly 80 for automatically moving the cathode 70 downwardly to a height such that the working face 71 thereof is at an elevation 0.006 inch above the maximum elevation measured by the contact sensors 120. It will be appreciated that the elevation of the cathode 70 has also been previously calibrated with the elevation of the anode 36. At this point, the cathode 70 has been set at its machining elevation.

After the cathode 70 has reached its machining elevation, with the cathode carriage 45 disposed at one end of the workpiece 21, the processor 141 operates to turn on the electrolyte supply 144 and deliver electrolyte fluid to the cathode 70. The fluid enters the channel 72 in the cathode 70 under an elevated pressure, and exits the cathode via the slot 73 in a thin elongated sheet with a pressure preferably in the range of about 150 psi, to flow in the working gap 78 between the working face 71 of the cathode and the upper surface 22 of the workpiece 21. At the same time, the processor 141 operates to activate the electrode power supply 143 for delivering DC power to the anode 36 and the cathode 70. The electric power is connected with the positive potential applied to the anode 36 and the negative potential applied to the cathode 70. Thus, there is established a flow of current from the anode 36 through the workpiece 21 and the electrolyte fluid to the cathode 70 for removing material from the upper surface 22 of the workpiece 21 at the working gap 78.

When the electrolyte supply 144 and the electrode power supply 143 have been activated, the processor 141 activates the motor control circuit 145 for actuating the drive motors 51 to move the cathode carriage 45 from the left end of the workpiece 21 to the right end thereof, as viewed in FIG. 1. This motion will continue until the cathode 70 has completely traversed the length of the workpiece 21, as detected by the signals from the sensor assemblies 100. Preferably, the program for the processor 141 will be arranged to accelerate and decelerate the cathode carriage 45 beyond the edges of the workpiece 21 in order to uniformly machine the plate surface 22 near the edges of the workpiece 21.

As the cathode 70 crosses the right-hand edge of the workpiece 21, the electrode power supply 143 is automatically activated or deactivated, depending upon whether the cathode 70 is approaching or leaving the workpiece 21. This point can be determined by signals from the sensor assemblies 100, since the location of the cathode 70 with respect to the sensor assemblies 100, and the speed of travel of the cathode carriage 45 are known. This speed of travel is preferably constant on each pass of the cathode carriage along the workpiece 21 and is set at the speed necessary to machine the desired amount from the surface 22 of the workpiece 21. With a four-foot wide workpiece 21 and with a 40,000-amp power supply, the carriage 45 may, for example, move at a speed of about 41.7 inches per minute to machine 0.002 inch of metal from the surface 22 of the workpiece 21 during each pass. Preferably, the electrolyte supply 144 is not turned off at the end of each pass.

As the cathode carriage 45 traverses the length of the workpiece 21, the carriage blocks 115 of the sensor assemblies 100 are continually swept back and forth across the width of the workpiece 21, so that the sensor assemblies 100 may obtain accurate readings of the depth of cut across the entire surface area of the workpiece 21. For this purpose, the drive motors 118 are operated under control of the motor control circuit 145. Preferably, the rate of travel of the sensor carriage blocks 115 is such that they cross the width of the workpiece 21 once for each two inches of forward travel of the cathode carriage 45.

At the end of a pass, the maximum elevation of the upper surface 22 of the workpiece 21, as measured by the contact sensor 120 on the trailing end of the cathode carriage 45, is noted by the processor 141 and the depth of cut made during that pass is automatically calculated and displayed on a suitable one of the input/output devices 142, such as a CRT display. The processor 141 then automatically operates the sensor drive motors 106 and the cathode adjustment assembly 80 to lower the sensors and the cathode to a new elevation over the plate 21, such that the contact sensors 120 and the working face 71 of the cathode 70 will have the original 0.005 inch depression and 0.006 inch clearance, respectively. The processor 141 will also automatically adjust the travel speed of the cathode carriage 45 via the drive motors 51, if the desired depth of cut (e.g., 0.002 inch) has not been achieved during the preceding pass. A faster carriage speed will reduce the depth of cut and a slower carriage speed will increase the depth of cut. After these adjustments, the cathode carriage 45 will again be activated to make another pass in the opposite direction. The cycle will repeat until the variation in the surface 22 of the workpiece 21, as measured by the contact sensors 120, is less than +/−0.001 inch. The processor 141 may be programmed to make no more than a maximum number of machining passes automatically, regardless of surface conditions.

After one side of the workpiece 21 has been machined, the workpiece 21 may be removed, such as by an overhead vacuum lift (not shown) and placed in a turn over fixture (not shown). The workpiece 21 is turned over and placed back on the anode 36 for machining of the other side 23 in a manner similar to that described above. When machining the second side 23 of the workpiece 21, the water-jet sonic sensors 122 are activated and the gauge of the plate 21 as well as the surface variations is measured. The machining will continue until the surface 23 reaches tolerance and the desired gauge of the workpiece 21 is obtained. The processor 141 will automatically set the speed of the cathode carriage 45 on the last pass to obtain the desired plate thickness. The workpiece 21 can be machined to both the desired surface tolerance and gauge if the starting thickness of the plate is adequate.

After final machining, the workpiece 21 is again moved to the turn-over jig where the workpiece 21 is sprayed with fresh water and then squeezed dry. The final measurement of the workpiece 21 by the sonic sensors 122 may be printed out by an output printer to provided a reference of thickness variations for future processing needs.

For a cathode 70 having a working face 71 which is 1¼" wide by 66" long, with a slot 73 which is ¼" wide by 60" long, the electrolyte that flows from the slot 73 into the working gap 78 is under a pressure such that it will exert an upward force of about 5.63 tons on the cathode working face 71 and an equal downward force on the workpiece 21. Because of these large forces, the foundation 25 is quite massive, as are the I-beams 31 of the anode assembly 30 and the I-beams 48 of the cathode carriage 45. Similarly, the elongated footings 41 of the cathode support assembly 40 are relatively massive. By means of this massive structure, the deflection of the cathode 70 and the workpiece 21 under the force of the electrolyte fluid can be minimized to +/−0.0002 inch. In addition, the upward force on the cathode 70 may be balanced with the balancing weights 44. While it is desirable to minimize the deflection as much as possible, it will be noted that the deflection in the cathode carriage 45 is not critical since, if it is a constant, it can easily be compensated for in determining the location of the cathode 70 relative to the anode 36.

A unique advantage of the ECM system 20 is that, by reason of the upward force exerted by the electrolyte fluid, it is possible to "float" the entire weight of the cathode carriage 45 on the electrolyte fluid, thus transferring the majority of the weight from the rails 46 to the anode support assembly 30. Some downward force will preferably be maintained on the rails 46, however, for control purposes. Also, if desired, the entire foundation 25 may be floated on air bags to minimize the effect of earth tremors.

Preferably, the top surface of the anode support assembly 30 is ground smooth and sprayed with an insulating plastic. All the internal steel surfaces of the anode support assembly 30 may also be coated to help prevent corrosion from the electrolyte fluid.

The entire cathode carriage 45 may be enclosed in a cabinet (not shown) to minimize electrolyte splash. Deflectors may be installed to direct the electrolyte fluid to the sides of the workpiece 21 and into the trough 28. Preferably, the trough 28 drains by gravity to a sump (not shown) from which it may be recycled through suitable filtering apparatus (not shown). The trough 28 may be covered by a grating or the like (not shown) so that an operator can step on it to gain access to the anode support assembly 30.

The ECM system 20 may also be used to machine foil from sheet material. Thus, for example, a sheet having a thickness of approximately 0.035 inch may be electrochemically machined to a foil thickness of 0.004 inch. For this application the use of vacuum suction to hold the sheet in place on the anode may be disadvantageous since it could cause dimples on the surface of the foil at the location of the suction holes 37 due to a difference in electric current flow at those points of the sheet. Thus, in such applications, it may be desirable to use an alternative means for holding the sheet in place on the anode 36, such as screws, clamps or the like.

Because of the nearness of the cathode 70 to the anode 36 when machining foil, it may be difficult to adequately protect the anode 36 by masking. Accordingly, it is preferable that the ECM system 20 be utilized only for machining to foil sheets of a size of 5'×12', which will cover the entire working surface of the anode. The machined foil sheet may be cut to whatever size is needed.

Referring now also to FIGS. 6 and 7 of the drawings, there is illustrated an alternative embodiment of the ECM system of the present invention, generally designated by the numeral 150. The ECM system 150 is substantially identical to the system 20, except for the means for supporting the cathode carriage 45. Accordingly, parts of the ECM system 150 which are identical to corresponding parts in the ECM system 20 will bear the same reference numerals and only so much of the ECM system 150 will be described herein as is necessary to explain the differences in operation from the ECM system 20.

The ECM system 150 includes a cathode support assembly 151 which includes a pair of elongated, parallel rails 152, respectively mounted on the pedestal portion 27 of the foundation 25 adjacent to the opposite side edges thereof, and extending substantially the entire length thereof. Respectively depending from opposite side edges of the cathode carriage 45 are two elongated support shoes 153, each carrying a pair of support wheels 154 respectively disposed at opposite ends of the shoe 153 and mounted thereon for rotation about the axes of horizontal stub shafts 155. The shoes 153 are disposed so that the wheels 154 thereof are disposed for rolling engagement with associated ones of the rails 152. Thus, as the drive motor 51 of the carriage drive assemblies 50 are operated, the cathode carriage 45 rolls back and forth along the rails 152.

It is a fundamental aspect of the present invention that the advantages thereof are achieved by establishing a relative movement between the cathode 70 and the workpiece 21. This movement can be effected by holding the cathode 70 stationary and moving the workpiece plate 21, rather than vice versa. Thus, referring to FIGS. 4 and 5, there is illustrated an ECM system generally designated by the numeral 160, in which the cathode 70 is fixed and the anode 36 and the workpiece 21 mounted thereon are movable. Except for this difference, the ECM system 160 is substantially identical to the ECM system 20 and, therefore, parts thereof which are the same as corresponding parts of the ECM system 20 will bear the same reference numerals and only so much of the ECM system 160 will be described as is necessary to understand the difference in operation between it and the ECM system 20.

The foundation 25 of the ECM system 160 includes a pair of laterally spaced-apart, elongated, upstanding pedestals 161 projecting upwardly above the floor level 26. Respectively mounted on the pedestals 161 substantially parallel thereto are two elongated rails 162. Formed in the foundation 25 between the pedestals 161 and below the floor level 26 is a central trough 163 for accumulating electrolyte fluid. The ECM system 160 includes an anode carriage assembly 165, which is substantially identical to the anode support assembly 30, described above, except that each of the side plates 34 carries, adjacent to the opposite ends thereof, a pair of laterally outwardly extending horizontal stub shafts 166 on which are respectively rotatably mounted support wheels 167, the wheels 167 being disposed for rolling engagement with the rails 162.

There is also provided an anode drive assembly 170 which includes an electric drive motor 171 supported on a suitable mount 172 carried by the foundation 25 adjacent to one end of the pedestals 161. The output shaft of the motor 171 projects horizontally and carries bevel gears 173 which are disposed in meshing engagement with bevel gears 174 fixed respectively to adjacent ends of two elongated horizontal drive screws 175. The drive screws 175 are threadedly engaged with a pair of drive nuts 176 respectively depending from the anode carriage assembly 165 adjacent to opposite ends thereof and between the pedestals 161. The motor 171 is arranged to drive the gears 173 and 174 and thereby the horizontal drive screws 175 in a manner similar to that described above with respect to the drive assembly 50.

It will be appreciated that, in operation, as the drive motor 171 is operated, the rotation of the drive screws 175 effects a longitudinal rolling motion of the anode carriage assembly 165 along the rails 162 in a direction corresponding to the direction of rotation of the screws 175. In order to provide DC power and vacuum suction to the anode 36, a flexible carrier (not shown) such as the carrier 130, described above, may be used.

There is also provided a cathode support assembly 180 which includes two pairs of upstanding posts 181 disposed generally at the corners of a rectangle, with the pairs being respectively disposed on the foundation 25 outboard of the pedestals 161. The posts 181 of each pair are interconnected by a side beam 183, the side beams 183 being interconnected by the I-beams 48 of the cathode carriage 45, thereby to provide a permanent, fixed mounting for the cathode carriage 45.

Any of the ECM systems 20, 150 or 160 may also be used to machine ribs into flat plates or sheets. The process starts with a plate or sheet that has been previously machined to the desired gauge and tolerance. There is then substituted for the standard cathode 70 a cathode which is specially designed to cut the desired rib pattern, such as the cathode 190 illustrated in FIGS. 12–15. The cathode 190 is generally similar in shape to the standard cathode 70, with a reduced-width working face 191 at the lower end thereof. However, in this case there is formed in the working face 191 a plurality of transversely extending slots 192 which are equidistantly spaced apart longitudinally of the cathode 190 for forming a plurality of fingers 193. A cylindrical channel 194 extends longitudinally through the cathode 190 and communicates with the working face of each of the fingers 193, respectively through a plurality of ports 195, which may be rectangular in transverse cross section. The sides of the fingers 193 and the valleys therebetween are covered with a layer of electrical insulation 196 to a location spaced a slight distance from the distal ends of the fingers 193, leaving only a short uninsulated active area 198 at the end of each finger 193.

Figure 16:
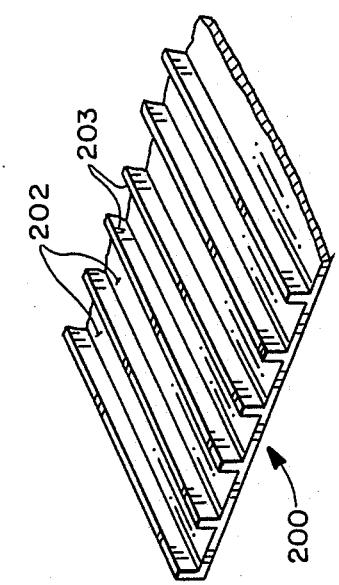
FIG. 16 is a fragmentary, perspective view of a ribbed plate as machined by the use of the cathode of FIGS. 12-15.
Figure 14:
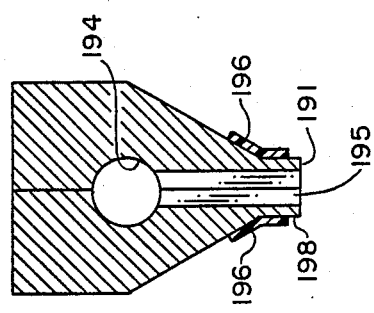
FIG. 14 is a view in vertical section taken along the line 14—14 in FIG. 13.
Figure 15:
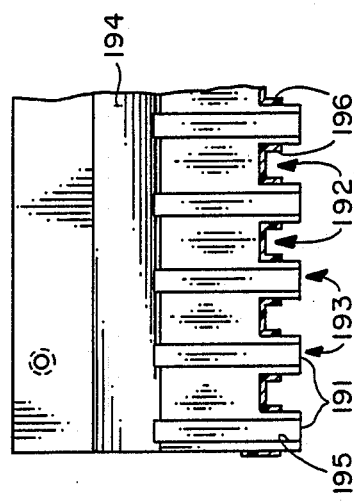
FIG. 15 is a fragmentary view in vertical section taken along the line 15—15 in FIG. 13.
Figure 12:
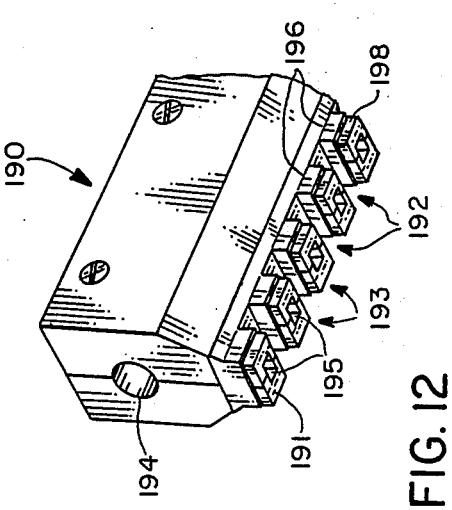
FIG. 12 is a fragmentary perspective view of a modified form of cathode for use with the electrochemical machining systems of FIGS. 1, 4 and 6.
Figure 13:
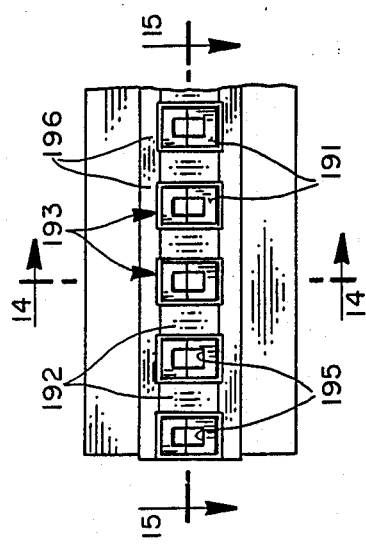
FIG. 13 is a fragmentary bottom plan view of the cathode of FIG. 12.

The machining operation in forming ribbed plate is similar to than used for standard flat plate. In the ribbed application, as the cathode 190 moves back and forth along the plate 200 (FIG. 16), machining activity takes place only in the vicinity of the tips of each of the fingers 193, which respectively machine grooves 202 in the plate 200, the grooves 202 being separated by ribs 203. In this application, the contact sensors 120 are not lowered onto the surface of the sheet 200. Rather, the water-jet sonic sensors 122 are used to determine the depth of machining done in the grooves 202.

While screw drives have been illustrated to effect longitudinal movement of the cathode carriage 45 and the anode carriage assembly 165, it will be appreciated that other types of drive mechanisms could be used. It will further be appreciated that alternatives to the flexible carrier 130 could be used to deliver utilities to the moving electrodes in the ECM systems, 20, 150, or 160.

From the foregoing, it can be seen that there has been provided an improved electrochemical machining system which permits flat plates or sheets of very large surface area to be machined to tolerances as close as plus or minus 0.001 inch, and permits sheets of difficult-to-machine metals, such as titanium, to be machined to foil gauge.

I claim:

1. Apparatus for electrochemical machining of one of the opposed surfaces of a flat metal workpiece in the form of a plate or sheet, said apparatus comprising: first electrode means having a flat support surface adapted to be disposed in electrical and rigid supporting contact with the surface of the workpiece opposite the one surface over the entire area of the workpiece, second electrode means having a working face with an area substantially less than the area of the workpiece, support means for supporting said second electrode means with said working face disposed a predetermined slight distance from the one surface of the workpiece in facing relationship therewith so as to establish a predetermined working gap between said second electrode means and a predetermined working area of the workpiece, transport means for establishing relative movement between said second electrode means and the workpiece for sweeping said working face across the entire one surface of the workpiece, means for continuously flowing an electrolyte fluid through the working gap in contact with said second electrode means and with the workpiece at a pressure substantially greater than atmospheric pressure, and coupling means for connecting an electrical voltage source to said first and second electrode means for promoting a flow of current through the workpiece and the electrolyte and said first and second electrode means to effect electrochemical removal of material from the one surface of the workpiece.

2. The apparatus of claim 1, wherein the workpiece is in the form of a flat rectangular plate or sheet.

3. The apparatus of claim 1, wherein the workpiece has a length and a width, said working face extending across the entire width of the workpiece, said transport means establishing relative movement between said second electrode means and the workpiece longitudinally of the workpiece for sweeping said working face across the entire one surface of the workpiece in a single pass.

4. The apparatus of claim 1, and further comprising a rigid and massive support structure, said first electrode means being carried by said support structure.

5. The apparatus of claim 1, wherein said coupling means is adapted for connecting said first and second electrode means respectively to opposite polarity electrical potentials for promoting a flow of DC current through the workpiece and the electrolyte and said first and second electrode means.

6. The apparatus of claim 1, wherein said second electrode means includes a passage therethrough communicating with an opening in said working face, and means coupling said passage to a source of the electrolyte fluid under pressure for injecting said electrolyte fluid into the working gap through said opening.

7. The apparatus of claim 1, and further comprising means associated with said second electrode means for selectively adjusting the size of the working gap.

8. The apparatus of claim 1, wherein said first electrode means is movable for effecting movement of the workpiece with respect to said second electrode means.

9. The apparatus of claim 8, and further comprising a rigid base platform supporting said first electrode means and the workpiece thereon and movable for establishing longitudinal movement of the workpiece with respect to said second electrode means.

10. The apparatus of claim 9, wherein said transport means includes a pair of elongated rails, a plurality of wheels carried by said platform and disposed in rolling engagement with the rails, and motive means coupled to said platform for effecting rolling movement thereof along said rails.

11. The apparatus of claim 1, wherein said transport means includes means for effecting movement of said second electrode means with respect to the workpiece.

12. The apparatus of claim 11, wherein said transport means includes a pair of elongated rails, a wheeled carriage supporting said second electrode means and disposed in rolling engagement with said rails, and motive means coupled to said carriage for effecting movement thereof along said rails.

13. The apparatus of claim 11, wherein said transport means includes track means, a carriage supporting said second electrode means and disposed on said track means for sliding movement longitudinally therealong, motive means coupled to said carriage for effecting movement thereof longitudinally of said track means, and fluid means for establishing a very slight clearance between said carriage and said track means to permit substantially frictionless movement of said carriage along said track means.

14. The apparatus of claim 1, wherein said transport means includes screw drive means.

15. The apparatus of claim 1, and further comprising means for securely holding the workpiece in place on said first electrode means.

16. The apparatus of claim 1, and further comprising sensor means for determining the maximum height of the one surface of the workpiece above said support surface of said first electrode means.

17. The apparatus of claim 16, and further comprising adjustment means coupled to said second electrode means for controlling the magnitude of the working gap, and control means coupled to said adjustment means and to said sensor means and to said transport means and being responsive to signals from said sensor means for controlling the speed of operation of said transport means to maintain a predetermined rate of material removal and for controlling the operation of said adjustment means to maintain a predetermined working gap.

18. The apparatus of claim 1, wherein said working face is grooved to machine a grooved pattern on the one surface of the workpiece.

19. A method for electrochemical machining of one of the opposed surfaces of a flat metal workpiece in the form of a plate or sheet, said method comprising the steps of: supporting the workpiece on a first electrode having a flat support surface such that the support surface is disposed in electrical and rigid supporting contact with the surface of the workpiece opposite the one surface over the entire area of the workpiece, providing a second electrode having a working face with an area substantially less than the area of the workpiece, supporting the second electrode with its working face disposed a predetermined slight distance from the one surface of the workpiece in facing relationship therewith so as to establish a predetermined working gap between the working face and a predetermined working area of the workpiece, establishing relative movement between the second electrode and the workpiece for sweeping the working face across the entire one surface of the workpiece, continuously flowing an electrolyte fluid through the working gap in contact with the second electrode and with the workpiece at a pressure substantially greater than atmospheric pressure, and applying an electrical potential across the first and second electrodes for promoting a flow of current through the workpiece and the electrolyte and the first and second electrodes to effect electrochemical removal of material from the one surface of the workpiece.

20. The method of claim 19, wherein the relative movement is effected by moving the first electrode to thereby establish movement of the workpiece while the second electrode is held stationary.

21. The method of claim 19, wherein the relative movement is effected by moving the second electrode while the workpiece is held stationary.

* * * * *